(12) United States Patent
Gerligand et al.

(10) Patent No.: US 9,778,487 B2
(45) Date of Patent: Oct. 3, 2017

(54) ROTATIONALLY STABILIZED CONTACT LENS WITH IMPROVED COMFORT AND METHOD OF OPTIMIZATION

(71) Applicant: Johnson & Johnson Vision Care, Inc., Jacksonville, FL (US)

(72) Inventors: Pierre-Yves Gerligand, St. Johns, FL (US); Philippe F. Jubin, Fernandina Beach, FL (US); Jason M. Tokarski, Jacksonville, FL (US)

(73) Assignee: Johnson & Johnson Vision Care, Inc., Jacksonville, FL (US)

( * ) Notice: Subject to any disclaimer, the term of this patent is extended or adjusted under 35 U.S.C. 154(b) by 85 days.

(21) Appl. No.: 14/836,252

(22) Filed: Aug. 26, 2015

(65) Prior Publication Data
US 2017/0059882 A1    Mar. 2, 2017

(51) Int. Cl.
*G02C 7/02*    (2006.01)
*G02C 7/04*    (2006.01)

(52) U.S. Cl.
CPC ............. *G02C 7/048* (2013.01); *G02C 7/028* (2013.01); *G02C 7/049* (2013.01); *G02C 2202/04* (2013.01); *G02C 2202/06* (2013.01)

(58) Field of Classification Search
CPC .......... G02C 7/024; G02C 7/028; G02C 7/048
USPC ....................... 351/159.73–159.77
See application file for complete search history.

(56) References Cited

U.S. PATENT DOCUMENTS

| | | | |
|---|---|---|---|
| 5,760,870 A | 6/1998 | Payor | |
| 8,668,331 B2 * | 3/2014 | Gerligand | G02C 7/048 351/159.02 |
| 2002/0071094 A1 | 6/2002 | Roffman | |
| 2005/0041202 A1 | 2/2005 | Jubin | |
| 2005/0259220 A1 | 11/2005 | Neadle | |
| 2008/0074611 A1 * | 3/2008 | Meyers | G02C 7/04 351/159.02 |
| 2013/0077045 A1 | 3/2013 | Gerligand | |
| 2014/0063444 A1 | 3/2014 | Wildsmith | |

* cited by examiner

*Primary Examiner* — Zachary Wilkes
(74) *Attorney, Agent, or Firm* — Carl J. Evens

(57) ABSTRACT

The invention provides an improved rotationally stabilized contact lens design and method of designing such a lens which minimizes stabilization time of the lens while maximizing the lens on-eye comfort. The lens and the method of designing the lens utilizes and combines non-circularity and thickness differential aspects resulting in equivalent or minimized stabilization time, ease of insertion and manufacturability as well as maximum comfort that is improved over that of what either aspect can achieve independently.

5 Claims, 10 Drawing Sheets

ROTATIONALLY STABILIZED CONTACT LENS WITH IMPROVED COMFORT AND METHOD OF OPTIMIZATION

BACKGROUND OF THE INVENTION

1. Field of the Invention

The present invention relates to ophthalmic lenses, and more particularly to contact lenses which are rotationally stabilized. Specifically the present invention relates to designs and methods which optimize non-circularity and thickness differential to improve comfort while ensuring satisfactory rotational stabilization.

2. Discussion of the Related Art

Contact lenses are considered medical devices and may be worn to correct vision and/or for cosmetic or other therapeutic reasons. Contact lenses have been utilized commercially to improve vision since the 1950s. Early contact lenses were made or fabricated from hard materials, and were relatively expensive and fragile. Although these contact lenses are still utilized, they are not suitable for all patients due to their poor initial comfort. Later developments in the field gave rise to soft contact lenses, based upon hydrogels, which are extremely popular and widely utilized today. The introduction of soft contact lenses has significantly improved the comfort experienced by the wearer. One type of contact lens is a spherical contact lens, which for the most part provides a uniform power, and since these lenses are substantially spherical they are rotationally symmetric so rotational placement or positioning on the eye is not a major concern. For those patients who require an astigmatic correction, one can provide a cylinder optical power correction in addition to the spherical power correction to achieve vision correction. These lenses, sometimes referred to as toric lenses, require the optical design to be rotationally stabilized in the correct orientation while worn on eye. In the astigmatic patient, relative rotational orientation of the lens is important to correct one's vision.

Astigmatism is caused by a non-rotationally symmetric curvature of the cornea and/or the crystalline lens. A normal cornea is substantially rotationally symmetric, whereas in an individual with astigmatism this is not the case. In other words, the cornea of the eye is actually more curved or steeper in one direction than another, thereby causing an image to be stretched out into a line of focus rather than focused to a single point. Toric rather than spherical/single vision lenses can be used to address this. A toric lens is an optical element having two different target powers in two orientations that are perpendicular to one another. Essentially, a toric lens has one power, spherical for correcting myopia or hyperopia, and one power, cylinder, at a particular axis, for correcting astigmatism, both powers built into a single lens. These powers are created with curvatures oriented at different angles which are preferably maintained relative to the eye. The proper rotational orientation of the toric lens is thus essential to properly correct for astigmatism. However, with use, toric contact lenses may tend to rotate on the eye thereby temporarily providing sub-optimal vision correction. Accordingly, currently utilized toric contact lenses also include a mechanism to keep the contact lens relatively stable and in the proper orientation on the eye when the wearer blinks or looks around in order to maintain the correct vision correction. This mechanism also serves to return the lens to the stable and proper orientation on eye after insertion or when the lens moves out of the proper position and orientation. To ensure the proper orientation of the lens, various methods of lens stabilization have been utilized in the art such as ballast or preferential thick and thin zones. While there are various ways to achieve stabilization, all ways ultimately will be affected to varying degrees, by the interaction of the posterior surface of the contact lens with that of the anterior surface of the eye, and the eyelids as well, particularly in the peripheral regions, which may also negatively impact vision and or subjective wearer comfort.

The challenge with currently designed or utilized stabilization zones is a tradeoff between contact lens stability and comfort, as well as the physical limitations associated with increased thickness. Changes to the design to improve rotational speed, such as increasing the surface slope of the stabilization zone, also increases contact lens thickness and may adversely impact comfort. Additionally, the contact lens design has to accomplish two things; namely, to rotate to the proper orientation on insertion, and to maintain that orientation through the wear period. Conventional designs require tradeoffs in performance between these multiple considerations.

In U.S. Pat. No. 6,406,145, rotationally stabilized contact lenses with minimal thickness changes are disclosed. In U.S. Pat. No. 6,491,392 the design of the stabilization features incorporates the use of spline or polynomial functions in order to improve comfort, while U.S. Pat. Nos. 6,939,005 and 7,159,979 focus on the rate of change of the thickness differential in order to reduce the time to stabilize the lens. U.S. Pat. Nos. 7,201,480 and 7,682,019 employ the use of thin zones for stabilization purposes.

In more recent attempts to address the needs of the astigmatic patient, for example, U.S. Pat. No. 8,827,448 proposes the use of astigmatism-free customized lenses for refractive correction with a first cylindrical power on the anterior surface and a second cylindrical power on the posterior surface of the contact lens. While it is suggested that improved visual acuity is achieved with such a design, these items are limited to the optical zone of the lens and how that interacts with an asymmetrically shaped cornea. Design changes in other regions, most notably the peripheral region of the lens, can still have an impact and would not adversely impact those limited to the optical zone seeking to improve visual acuity and thus coexist and further improve lens performance.

Early use of non-round lenses for stabilization purposes is disclosed in U.S. Pat. No. 5,760,870, primarily as a way to avoid thickening the lens for stabilization purposes. The inventors of the '870 patent indicated that lens thickening resulted in patient discomfort, undesirable power variations, and reduced oxygen permeability in the thickened regions, advocating the use of a non-round lens instead and the resulting difference in the aspect ratio of the lens to achieve stabilization rather than thickness differential. More recently, in U.S. Pat. No. 8,668,331 the use of a non-round lens to maximize the lens-lid interaction for the purposes of centration, rotation, and stabilization is disclosed and can be instructive. In US Published Patent Application No. US20140063444 assigned to the same assignee as the present invention, the use of round and non-round shapes along with stabilization zones is disclosed; however optimizing the shape and thickness in combination is not discussed.

In summary, previous innovators in this space have attempted to address this issue of stabilization by selective lens thickening, lens thinning, prism ballast, and other methods all of which can be generally characterized as thickness differential designs, while others looked for a solution by the use of non-round lenses, which may be generally characterized as the circularity/non-circularity designs, which in some cases attempted to mask the astigmatism altogether, however, none to date have looked to combine these methods in an optimized fashion in a single lens design to achieve rotational stabilization with improved comfort. Depending on the approach one uses, and because it is a balance between rotational stability and comfort, it is believed there is an opportunity that exists by combining the best from these approaches.

Accordingly, there exists a need for contact lenses with rotational stability achieved by simultaneously optimizing non-circularity and thickness differential as a system in order to achieve improved on eye performance while maintaining a high degree of comfort and vision correction.

SUMMARY OF THE INVENTION

The contact lens in accordance with the present invention overcomes the disadvantages associated with the prior art as briefly described above by providing a non-circular rim design to be properly orientated while minimizing the amount of thickness differential present in the lens. Specifically the discovery that there exists a preferred relationship between the shape of the rim of the lens (non-circularity or diametrical aspect ratio) and the amount of thickness differential employed, such that the resulting lens is optimized for stabilized orientation, comfort and handling, thereby enabling improved performance results not obtainable with either approach of non-circularity or thickness differential alone.

In accordance with one aspect, the present invention is directed to a method for optimizing the stabilization of a contact lens on eye while maximizing comfort. This method includes several steps, the first being defining a matrixed set of peripheral geometries having a noncircularity component and a thickness differential wherein the noncircularity component ranges from 95% to 60% from a true circle and the thickness differential ranges from 0.1 mm to 0.4 mm wherein the matrixed set includes a minimum of two non-circularity values and a minimum of two thickness differential values, This is then followed by calculating the time to stabilize for each item in the matrixed set for a given noncircularity component and a given thickness differential; and then creating a contour plot showing the time to stabilize for each item in the matrixed set. One would then assess the contour plot and define the preferred region based upon at least one of three variables of maximizing comfort, minimizing time to stabilize, or minimizing manufacturing difficulty, and then ultimately select the peripheral geometry having both a noncircularity component and having a thickness differential which produces an optimal stabilization time within the confines of the preferred region. If the resulting peripheral geometry with its noncircularity component (i.e.: diametrical aspect ratio) and thickness differential requires further optimization, the process can be repeated until the resulting combinations achieve the conditions desired.

In accordance with another aspect, the present invention is directed to a contact lens having an inner optic zone for correcting vision, and outer zone configured for providing rotational stability wherein rotational stability is achieved by the combination of noncircularity or what we call decreasing diametrical aspect ratio and a thickness differential component. The noncircularity or decreasing diametrical aspect ratio may be described by a pair of effective dimensions proportionally related and defined with inscribed and circumscribed circles as well as the positioning of the centers of these circles to create a family of non-circular shapes. The diametrical aspect ratio or extent of noncircularity is preferably between 0.6 and 0.95. The thickness differential component may be defined by the difference between the maximum and minimum thickness of the lens this difference preferably being between 0.1 mm and 0.4 mm. Peripheral zones can be both symmetric and asymmetric. The centers of the circumscribed and inscribed circles which define the effective dimensions of the lens shape may be coincident or non-coincident and may lie on the same or different vertical or horizontal meridians.

Optimization of stabilization may be measured by assessing how quickly a lens stabilizes to its desired rotational position. Lens comfort on the other hand, is somewhat more subjective, but nevertheless may be assessed and confirmed by clinical studies. While both non-circularity and thickness differential independently may achieve, in different ways, a reduction in stabilization times, the combination of the two can not only improve stabilization time greater than either item alone, but in a more comfortable fashion in accordance with the present invention. While reductions in thickness differential may improve comfort, this also negatively impacts stabilization efficacy. Increases in non-circularity may improve stabilization efficacy but at the expense of comfort, increased manufacturing difficulty and costs as well as increased handling difficulties. In accordance with the present invention, one object is to provide a method of how one can employ these two approaches to yield an optimized design that performs better than one using either single approach alone. Another object is the resulting lens design when this approach is employed. Yet another object is to improve upon existing designs using the methodology disclosed in accordance with the present invention. The contact lenses of the present invention may be utilized with any type of contact lens optics without additional cost and optimized to improve clinical comfort and/or physiology.

BRIEF DESCRIPTION OF THE DRAWINGS

The foregoing and other features and advantages of the invention will be apparent from the following, more particular description of preferred embodiments of the invention, as illustrated in the accompanying drawings.

DETAILED DESCRIPTION OF THE PREFERRED EMBODIMENTS

Figure 1A:
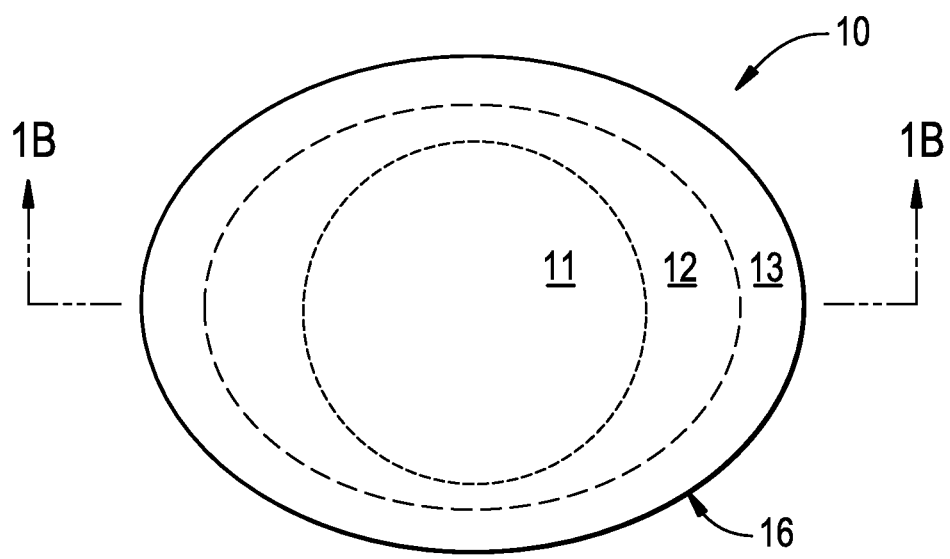
FIG. 1A provides a representative drawing of the lens and its regions looking through the noncircular lens itself in accordance with the present invention.

For purposes of the present invention a contact lens 10 as shown in FIG. 1A is defined by at least two distinct regions. The inner region 11 from which the vision correction is obtained and the outer peripheral region 13 of the contact lens 10 that provides mechanical stability of the contact lens 10 on eye. A third optional intermediate region 12 located between the inner region 11 and the outer region 13 can be utilized for blending the two aforementioned regions in a smooth manner such that abrupt discontinuities do not occur. In some exemplary embodiments the intermediate region 12, may not be required.

The inner region 11 or optical zone provides vision correction and is designed for a specific need such as single vision correction, astigmatism vision correction, bi-focal vision correction, multi-focal vision correction, custom correction or any other design that may provide vision correction. The outer periphery or peripheral zone 13 provides for basic fit and stabilization of the contact lens on the eye including, centration and orientation. Rotational stabilization is fundamental when the optical zone includes non-rotationally symmetric features, such as astigmatic correction and/or higher order aberration correction. The optional intermediate region or zone 12 ensures that the optical zone and the peripheral zone are blended smoothly. It is important to note that both the optical zone 11 and the peripheral zone 13 may be designed independently, though sometimes their designs are strongly related when particular requirements are necessary. For example, the design of a toric lens with an astigmatic optical zone might require a particular peripheral zone for maintaining the contact lens at a predetermined orientation on the eye.

Figure 1B:
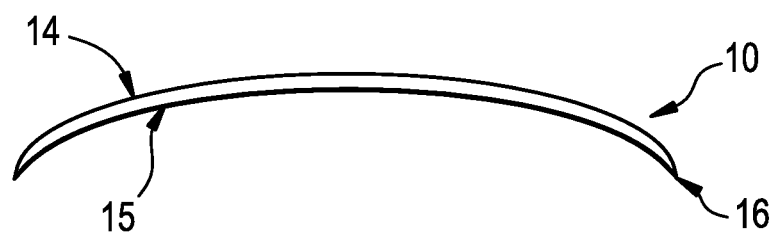
FIG. 1B provides a cross-sectional representation of the noncircular lens shown in FIG. 1A in accordance with the present invention.

For purposes of the present invention a contact lens is also defined by a front surface 14, a back surface or base curve 15 and an edge 16 as shown in FIG. 1B which is a cross section of the lens of FIG. 1A. The front and back surface of the contact lens is described by at least two regions, the inner region 11 from which the vision correction is obtained and the outer region 13 or periphery of the contact lens that provides mechanical stability of the contact lens on eye. As stated previously an optional intermediate region 12 located between the inner region 11 and the outer region 13 may be used for joining and/or blending the two aforementioned regions in a continuous and/or smooth manner such that discontinuities do not occur as described above. In certain situations with noncircular designs, the intermediate region 12 allows one to easily transition from a circular optical zone to the noncircular periphery while avoiding discontinuities, and making smoother thickness changes along the radial dimension of the lens 10.

Lens thickness is an important variable which is optimizable and may be determined in any of the three regions, but preferably in the outer or peripheral region 13 by simply measuring the relative distance along a direction perpendicular to the base curve between the front surface 14 and back surface 15. The thickness differential is defined as the difference between the nominal thick portions of the lens and the nominal thin portions of the lens. The nominal thick portion represents the maximum peripheral thickness of the lens. The nominal thin portion of the lens lies along the meridian of minimum peripheral thickness, but is specified as the thickness at a proportionally equivalent radial distance to that of the maximum thickness of the lens. This is an important variable for the purposes of both stabilization efficacy as well as comfort. In general the larger the thickness differential the more effective the stabilization effect, unfortunately the larger thickness differentials also tend to be more noticeable to the wearer and may result in more discomfort particularly for sensitive lens wearers. In accordance with the present invention, one can calculate the effect of using a reduction, or percentage, of a given thickness differential and calculate the effect of this reduction or percentage has on the time it takes for a given lens design to stabilize as well as the impact to comfort. One can also target a desired thickness differential directly. Our studies and experiences to date have shown thickness differentials in the range of 0.1 mm to 0.4 mm are more preferred for improved comfort while still achieving effective stabilization in accordance with the present invention.

The edge 16 is the rim of the contact lens 10, and is another useful variable to consider in an optimization scheme. For the purpose of the present invention, the shape of the edge 16 is preferred to be non-circular and may be asymmetric as well. For present purposes circularity/non-circularity is defined as the ratio of the largest inscribed diameter that can fit within the peripheral shape of the lens divided by the smallest circumscribed diameter that fits around the peripheral shape of the lens. Thus in a conventional circular contact lens, these two diameters would not only be equal, but the centers of both the inscribed and circumscribed diameters would be coincident. In accordance with the present invention, noncircularity may result in an oval lens. This occurs when the center of the largest inscribed diameter and the center of the smallest circumscribed diameter are coincident but the diameters of each are not equal. Noncircularity or what we call diametrical aspect ratio may also include asymmetric lenses relative to either the horizontal meridian or the vertical meridian. This asymmetric lens type may occur when the centers of the inscribed and circumscribed diameters are aligned along the vertical or the horizontal meridians respectively but are not coincident. Lastly another non-circularity example in accordance with the present invention may include an asymmetric profile where the non-coincident centers are not aligned either horizontally or vertically.

When one looks at a reduction of a thickness differential alone for a circular lens (circular being defined as the diametrical aspect ratio being equal to 100%), the impact is that the time to stabilize increases with reducing percentages of the original thickness differential. When one evaluates increasing noncircularity or alternatively a decreasing diametrical aspect ratio, for a given starting thickness differential, one may see a slight reduction in time to stabilize, followed by no change, followed by an increase in time to stabilize. Thus for a thickness differential of 95%, starting with a circular lens (diametrical aspect ratio being equal to 100%) as the diametrical aspect ratio decreases from 100%, the time to stabilize decreases reaching its minimum at approximately 85% diametrical aspect ratio, further decreases in the diametrical aspect ratio after the 85% level result in a reversal and stabilization times then increase with further decreases in diametrical aspect ratios. However, this trend and rate of change changes with differing thickness differentials. As one investigates the combination of increasing noncircularity or decreasing diametrical aspect ratio coupled with reducing the thickness differential simultaneously, as in the present invention, such that local regions of minimum time to stabilize can be determined, one can define an improved product over that achievable with noncircularity or thickness differential alone.

Figure 2A:
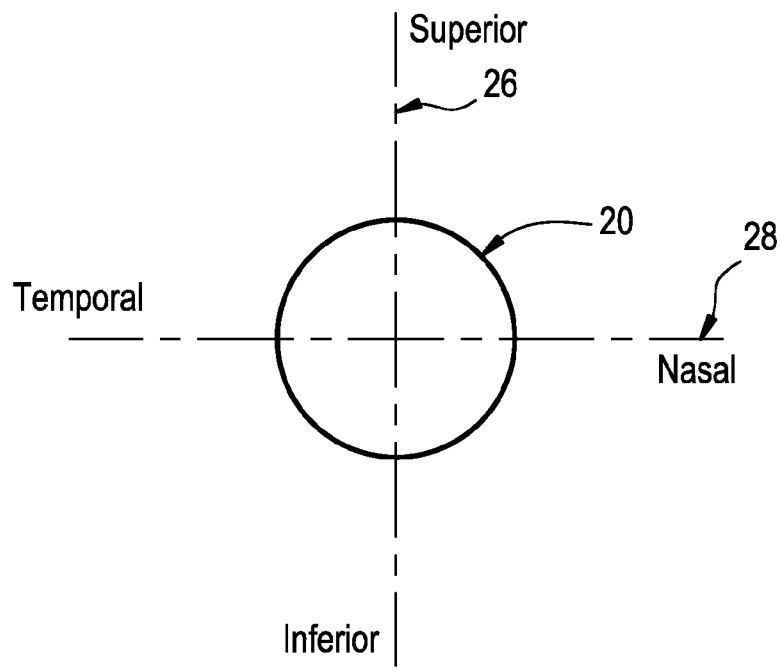
FIGS. 2A through 2E provide a schematic representation of various circular (conventional) and non-circular lens shapes and how the degree of noncircularity or diametrical aspect ratio is defined in accordance with the present invention.
Figure 2B:
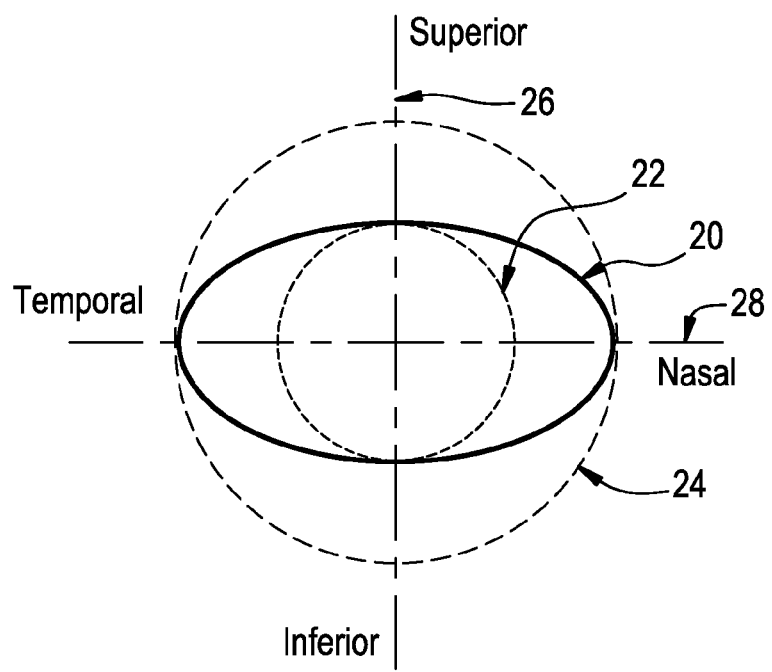
Figure 2C:
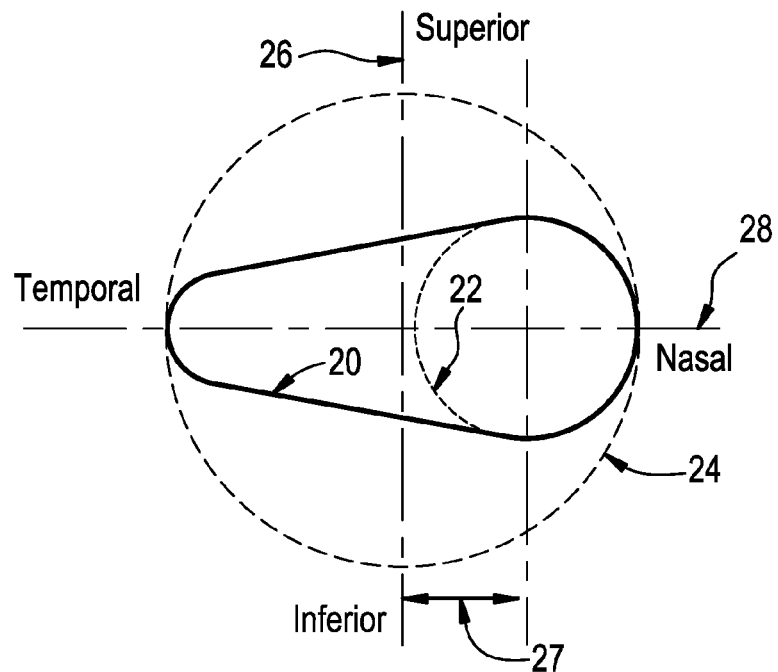
Figure 2D:
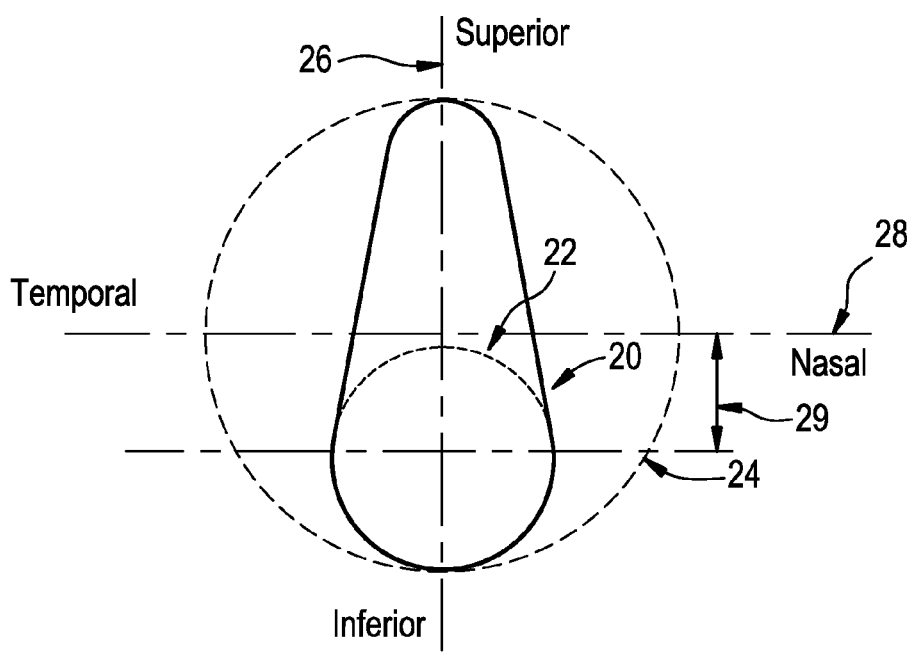
Figure 2E:
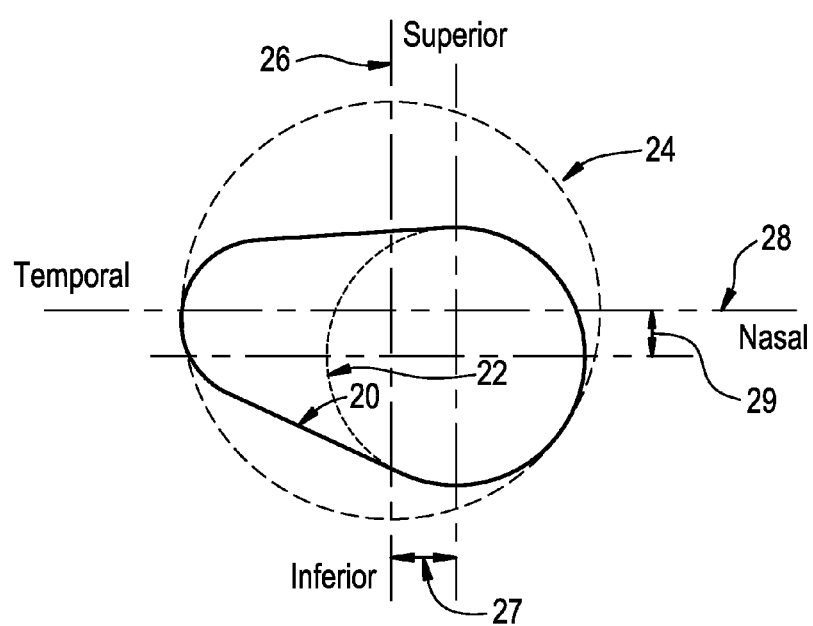

FIGS. 2A through 2E provide examples of five representative situations. In the first example, (see FIG. 2A) there is illustrated a conventional circular contact lens 20, wherein the inscribed and circumscribed circles (not shown) have equal diameters and also equal the lens diameter. In addition, the centers of all three (inscribed, circumscribed and lens itself) are coincident, and positioned at the intersection of the Superior-Inferior axis 26, and the Nasal-Temporal axis 28. Thus both circles and the positioning of the centers are no different than that of the peripheral margin of the lens 20. In the first non-circular example (see FIG. 2B) which is oval in shape, the inscribed circle 22 and circumscribed circle 24 have unequal diameters, but their centers are coincident. This results in a noncircular lens geometry 20, that is symmetric relative to both the Superior-Inferior axis (Vertical meridian) 26 and the Nasal-Temporal axis (horizontal meridian) 28. In FIG. 2C, the center of the inscribed circle 22 is displaced along the Nasal-Temporal axis (horizontal meridian) 28 by a distance 27, relative to the center of the circumscribed circle 24. This results in a temporal-nasal asymmetry while retaining the superior-inferior symmetry. In a similar fashion, in FIG. 2D, the center of the inscribed circle 22, is displaced along the Superior-Inferior axis (vertical meridian) 26 by a distance 29, relative to the center of the circumscribed circle 24. This results in a superior-inferior asymmetry while retaining the nasal-temporal symmetry. The last representative example in this series is shown in FIG. 2E, in which the inscribed circle 22 is displaced along both the Superior-Inferior axis 26, and the Nasal-Temporal axis, 28 relative to the circumscribed circle 24. This results in an asymmetric lens shape 20. As shown in FIGS. 2C through 2E, the extents of the horizontal offset 27 and the vertical offset 29 of the center position as well as the diameters of the inscribed 22, and circumscribed 24 circles, are not only related but may be changed and may be different in order to create a multitude of non-circular lens shapes beyond what is shown in the representative five examples.

Figure 3:
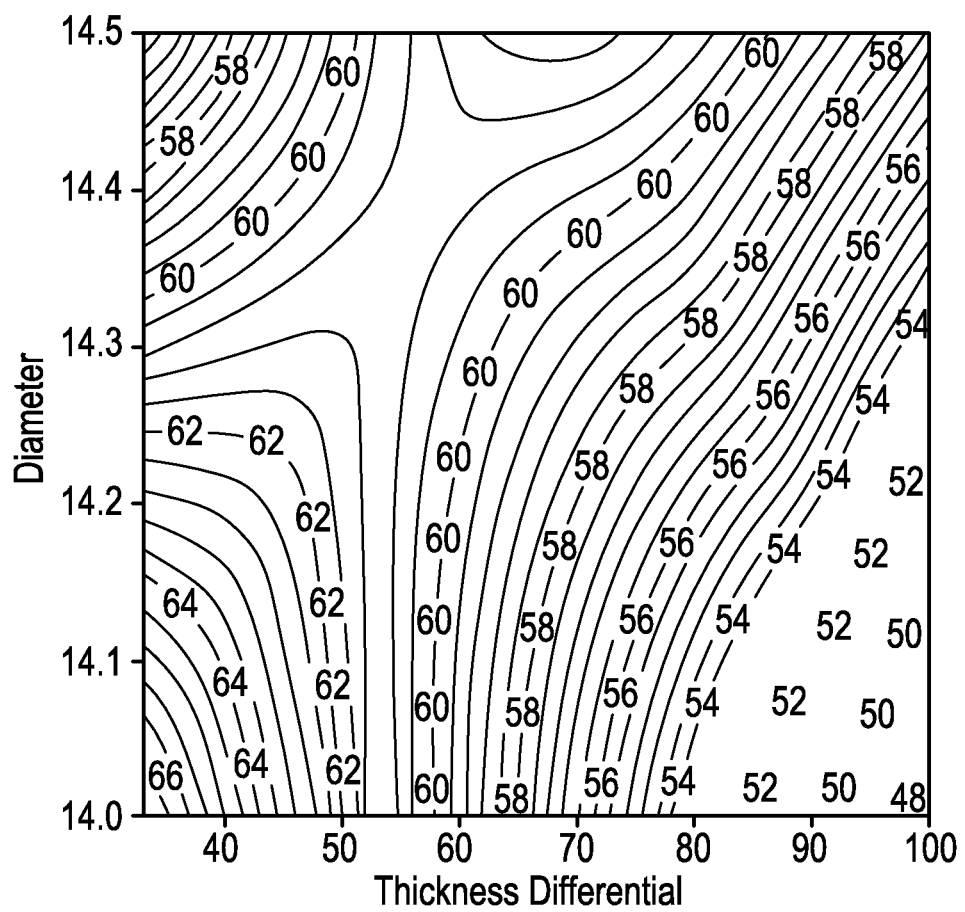
FIG. 3 provides a contour plot of clinical comfort readings for various conditions of both circular lens diameter and lens thickness differential whereas the higher values of clinical comfort scores represent more comfortable conditions.

FIG. 3 shows the comfort contour when one considers the relationship between thickness differential and multiple vertical dimensions/diameters of the circular lens. In this plot, comfort readings of 48 are less comfortable than comfort readings higher than 48. As one can see, the overall trend of decreasing thickness differential still improves comfort as one decreases thickness differential, but the rate at which the comfort improves is also diameter/dimension dependent. One can also see that for large thickness differentials, (>75%) as the circular diameter increases from 14.0 to 14.5, there is an increase in comfort for a given thickness differential that is above 75%. This is in contrast with smaller thickness differentials (<55%) where for a given thickness differential, as the circular diameter increases from 14.0 to 14.5, there is a decrease in comfort for a given thickness differential that is below 55%. In this example, the 14 mm dimension/diameter in combination with the smallest percentage thickness differential results in the highest level of comfort with a value of 66 or higher. While vertical diameters both larger and smaller than 14.00 mm diameters can be chosen, the following examples will focus on the 14.00 mm vertical diameter situation.

While the relationship between, and synergies achieved by leveraging both thickness differential and noncircularity are important, the effect of diameter needs to be considered as well. The subsequent examples we discuss will be for a 14.00 mm vertical diameter lenses with corresponding horizontal diameters based on the varying percentages of the Diametrical Aspect ratio. FIGS. 4A through 4D show the relationship of thickness differential and non-circularity that result in a preferred region 49 in accordance with the present invention. This region is one that maximizes comfort as well as other considerations such as stabilization time and ease of manufacturing. The contour plots shown in FIGS. 4A through 4D are based upon a lens having a consistent vertical dimension/diameter of 14.0 mm and contour bands or regions indicating the threshold times to stabilize scaled/normalized from greater than 90 to less than −50 seconds. Threshold time is defined as the time it takes for the lens to stabilize within 10 degrees of the final resting position in accordance with the theoretical prediction of the model. The normalization of the predicted times is relative to the time it takes for the stabilization of the starting design.

Figure 4A:
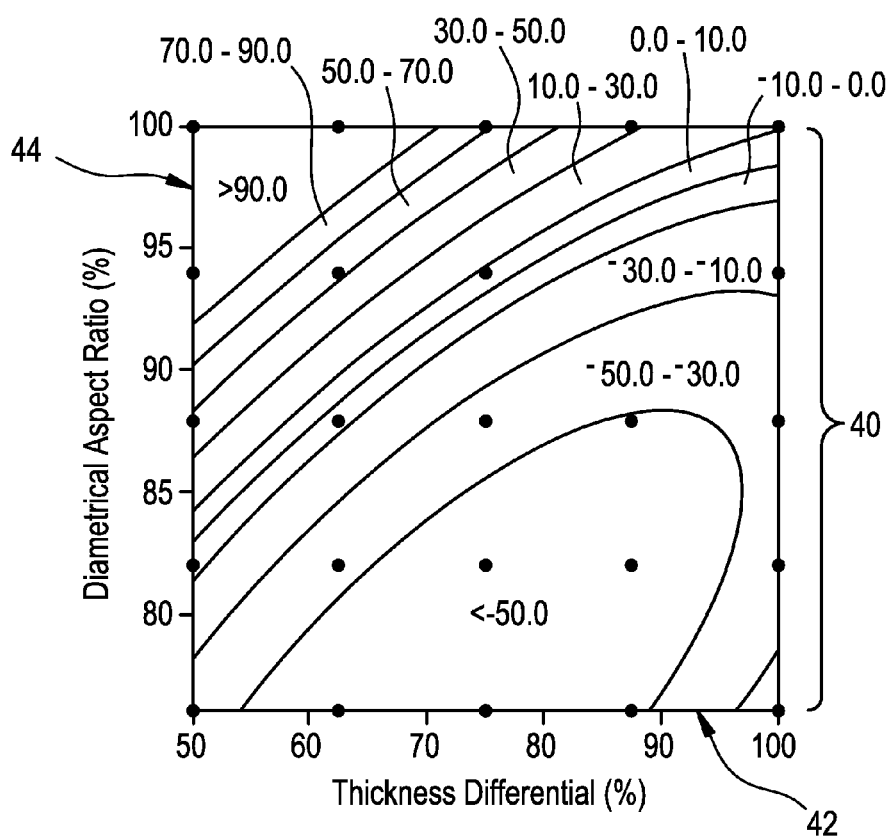
FIGS. 4A through 4D provide experimental contour plots of threshold time to stabilize for various diametrical aspect ratios (noncircularity) and various thickness differentials and how this information is leveraged to achieve the desired lens functionality for a given noncircular or diametrical aspect ratio and thickness differential in accordance with the present invention.

FIG. 4A shows a representative contour plot 40 of the threshold time for a 14.0 mm vertical diameter lens to stabilize. The corresponding horizontal diameters are obtained by dividing the 14.0 mm vertical diameter by the Diametrical Aspect ratio. Thus the 94% Diametrical Aspect ratio grouping would equate to a 14.89 mm horizontal diameter, while the 88% Diametrical Aspect ratio grouping would equate to a 15.91 mm horizontal diameter and so forth for the remaining Diametrical Aspect ratios. For each Diametrical Aspect ratio grouping with a constant horizontal diameter, respective thickness differentials were evaluated. This plot was constructed from a set of data points (shown as black dots on contour plot 40) for each diametrical aspect ratio and thickness differential combination indicated. Each data point is the average of the threshold times to stabilize on three eyes for the particular diametrical aspect ratio and thickness differential combination. The threshold times are normalized to the threshold time obtained for a given starting design (values less than 0 indicate faster stabilization time than starting design). This plot shows the impact of both thickness differential changes (horizontal axis) 42 as well as the impact of changing the diametrical aspect ratio or non-circularity changes of the lens periphery, (vertical axis) 44. As shown, this contour plot 40 is not monotonic and as such, this results in noncircularity-thickness differential combinations that are more desirable than others when both variables are considered simultaneously.

Figure 4B:
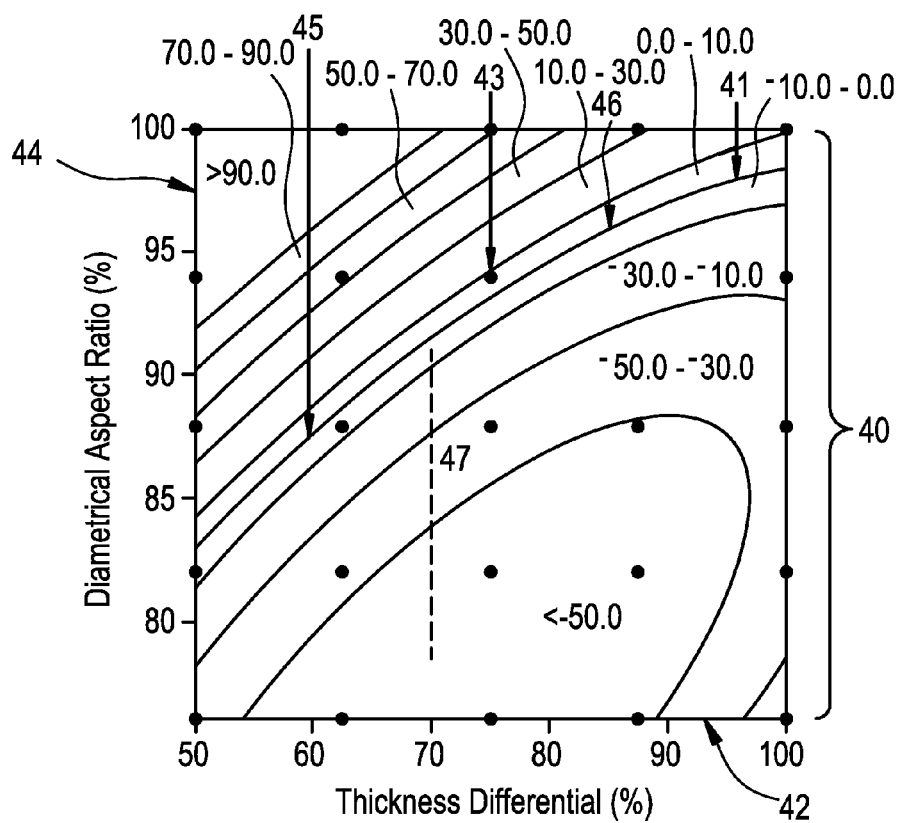

As FIG. 4B shows, depending which thickness differential reduction one is utilizing while increasing the extent of noncircularity or decreasing the diametrical aspect ratio, the resulting stabilization time response will be different depending on the combination chosen. As an example, three locations on a given path (contour line 46) are highlighted on contour plot 40, location path 41, corresponding to approximately a 97% thickness differential, location path 43, corresponding to approximately a 75% thickness differential, and location path 45 corresponding to approximately a 59% thickness differential. As one can see, the extent of noncircularity required is different for each particular location path in order to achieve the same level of stabilization time indicated by contour line 46. This particular contour line (noted as 46 in FIG. 4B) corresponds to the maximum stabilization time desired, as supported by clinical studies and is the dividing line between threshold times both greater and less than those times to stabilize of the starting design. While values below this contour line would be more acceptable for stabilization times, there are other considerations or trade-offs such as comfort and ease of manufacturing that need to be considered.

As stated previously while increasing the thickness differential generally decreases stabilization time, it may also decrease comfort. Clinical studies performed by applicant indicate a relationship of acceptable comfort to that of thickness differential. Based on these internal clinical studies, thickness differential reductions below 70% of the original thickness differential appear to provide more acceptable comfort as compared to those above 70%, as such we have determined that values to the left of a vertical boundary 47 at 70% thickness differential are preferred as shown in FIG. 4B in this example.

Figure 4C:
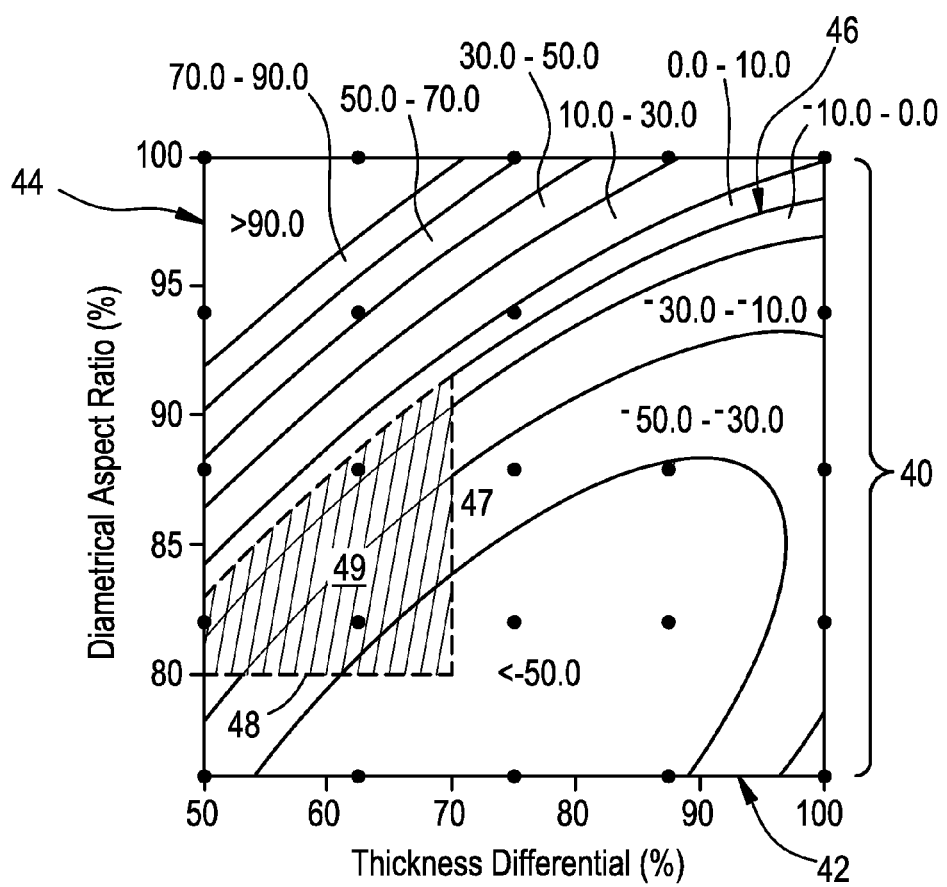

With respect to FIG. 4C, while the extent of noncircularity also contributes to accelerating time to stabilize, there are trade-offs here as well. As one departs from circular designs, with increasing noncircularity or decreasing diametrical aspect ratios, one introduces increasing manufacturing complexity as well as increased difficulty related to ease of handling once one goes beyond a certain level of noncircularity. As such, it has been determined that it is preferable to maintain the extent of non-circularity or the diametrical aspect ratio above 80%, represented on contour plot 40 as horizontal boundary 48 as shown in FIG. 4C. Thus, in accordance with the present invention, keeping to the left of vertical boundary 47, above horizontal floor 48, and below the corresponding portion of upper contour line band 46 one may define the preferred region 49 (shown shaded) which maximizes the inter-related considerations of: time to stabilize; wearer comfort; ease of insertion/handling; and manufacturability complexities to produce the optimal stabilization feature employing lens thickness differential and lens noncircularity which in this case is shown for the 14.00 mm vertical diameter lens in accordance with the present invention.

In a preferred aspect of the present invention, one may choose to further enhance the lens performance by focusing more on one consideration over that of another while remaining within the confines of the previously described preferred region 49. For example if decreasing stabilization time was more important than the other considerations, one would create designs having noncircularity and thickness differentials that place one in the lower right hand corner of the preferred region 49. If one was more focused on increasing comfort as the most important consideration, one would reduce the thickness differential, thus increasing comfort by choosing noncircularity and thickness differentials that place one in the left portion of the preferred region. Lastly, as it relates to design considerations, if one was more concerned with ease of insertion and/or manufacturability concerns, one would target the upper portion of the preferred region and produce lens designs that have a minimized extent of noncircularity and corresponding thickness differentials that fall within the preferred region.

Figure 4D:
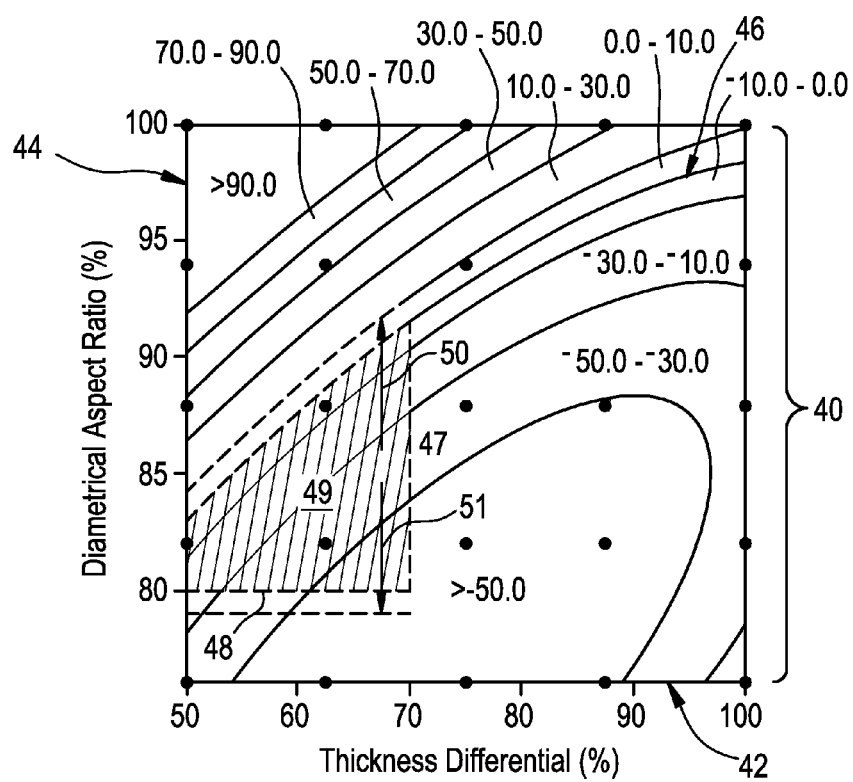

As stated previously the vertical diameter chosen for the set of non-circular and thickness differential combinations will produce a unique response surface. Increasing or decreasing the vertical diameter (and thereby a new set of non-circular and thickness differential combinations) will result in a change in this response surface and movement of the preferred region 49 primarily in the form of a vertical shift of the preferred region 49 as shown in FIG. 4D. In accordance with an exemplary embodiment, it is believed an increase in vertical diameter will result in faster stabilization times thus resulting in a corresponding upward shift 50 of the preferred region. Accordingly, a decrease in the vertical diameter will increase stabilization times and produce a downward shift 51 of the preferred region.

While any initial starting design may be employed and further improved using the methodology described in accordance with the present invention, it is preferred to start with a known design as the starting point and improve its functionality by modifications to its noncircularity and introducing reductions in thickness differentials to achieve a more comfortable yet effectively stabilized design. Known designs may be works in process, previously commercialized designs, or former existing designs.

Figure 5:
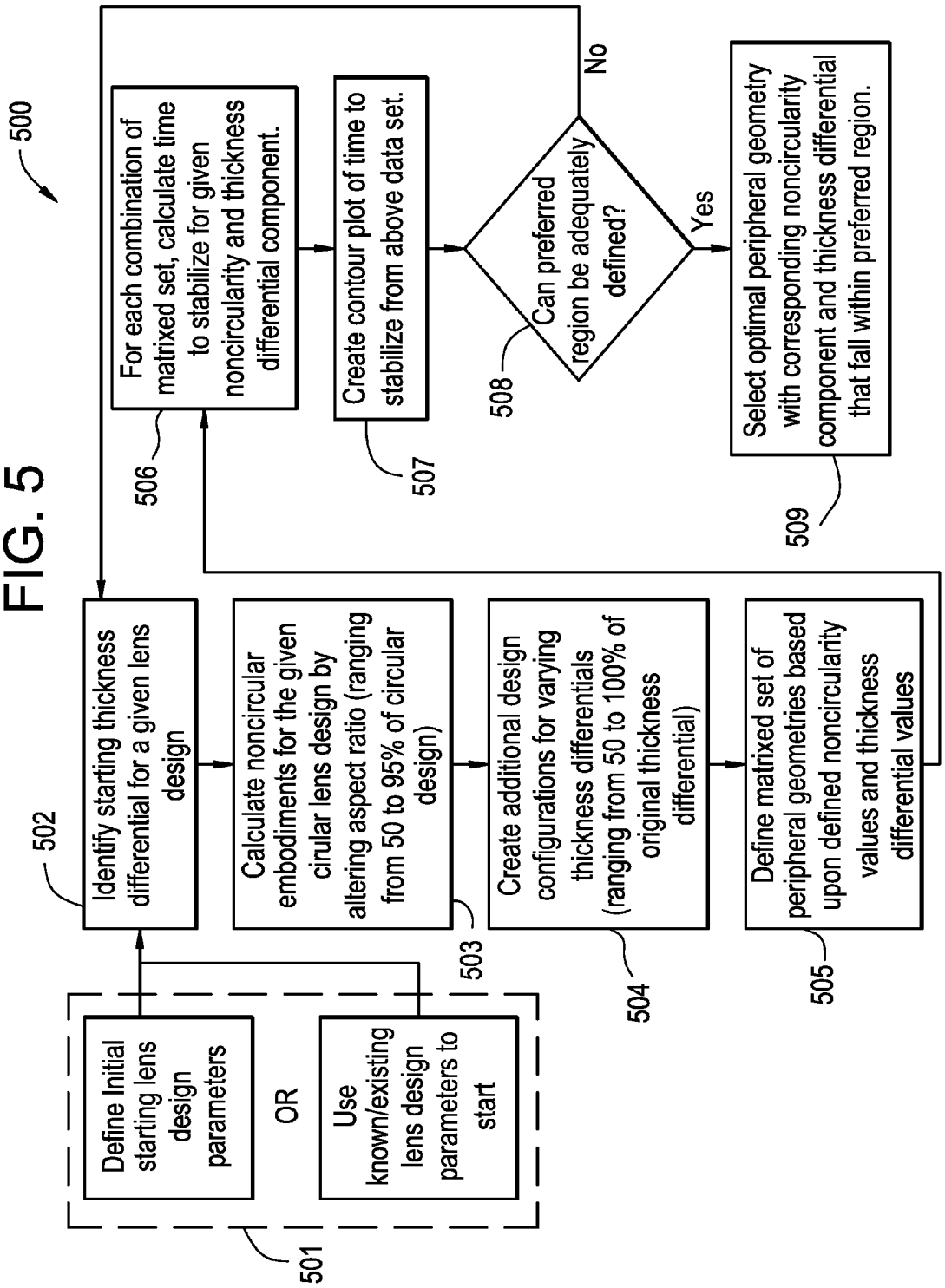
FIG. 5 shows a representative flow chart of the methodology employed in accordance with the present invention.

As shown in FIG. 5, the flow chart 500 begins with step 501, first defining the initial starting lens design parameters or using pre-defined lens design parameters of an existing design. For a given design, one first calculates the initial thickness differential, step 502. This will be the starting point as well as the maximum value of thickness differential and accordingly designated as the 100% thickness differential. For the given starting lens design (circular or noncircular), one can redesign the edge profile by altering aspect ratios to achieve increasingly more noncircular versions of starting lens geometry. That is to say starting with a given vertical diameter dimension, one would use the diametrical aspect ratio to define the horizontal diameter dimension for each family of values from 50 to 95% of the circular design and preferably from 60 to 95% of the circular design, and most preferably from 80 to 95% of the circular design, step 503. This process is repeated for each thickness differential between 50% and 100% of starting value using adequate steps or increments of thickness differentials and for each diametrical aspect ratio option down to at most 50% noncircularity in adequate noncircularity increments, step 504. Once all permutations of diametrical aspect ratios and thickness differentials are defined, the stabilization time for each permutation is calculated, step 505; one can then populate the matrix with values and create the corresponding contour plot, step 506 and step 507. While each starting design will yield differing results for the stabilization time contour plot, for designs of same family one can expect similar shapes and trends, even if not identical. The next step is to identify the preferred region on the resulting contour plot: by identifying the vertical thickness differential boundary between 50 and 100% depending on level of comfort to be maximized; identifying the lower limit of noncircularity as the horizontal floor of the preferred region depending on the ease of handling and ease of manufacturability; and lastly identify the maximum resulting contour line for stabilization time that is equal to or less than that of the contour line for the stabilization time for the normalized starting design to ensure equivalent or if desired, improved stabilization to ultimately select the optimal geometry, steps 508 and 509. If one determines that the region is not adequate in step 508, one can than repeat the process for diameters greater or less than the starting diameters to ascertain if these alternative diameters further improve comfort, handling, and ease of manufacturing by returning to step 502. This process can be repeated in an iterative fashion to achieve the desired results.

Although shown and described is what is believed to be the most practical and preferred embodiments, it is apparent that departures from specific designs and methods described and shown will suggest themselves to those skilled in the art and may be used without departing from the spirit and scope of the invention. The present invention is not restricted to the particular constructions described and illustrated, but should be construed to cohere with all modifications that may fall within the scope of the appended claims.

What is claimed is:

1. A method that optimizes the stabilization of a contact lens on eye while maximizing comfort comprising the steps of:

defining a matrixed set of peripheral geometries having a noncircularity component and a thickness differential wherein the noncircularity component defined as the ratio of the largest inscribed diameter divided by the smallest circumscribed diameter wherein said ratio ranges from 95% to 60% from a true circle and the thickness differential defined as the additive thickness to the nominal thickness of the nominal thin portions of the lens which ranges from 0.1 mm to 0.4 mm wherein the matrixed set includes a minimum of two noncircularity values and a minimum of two thickness differential values, calculating a time for the lens to stabilize on eye for a given noncircularity component and a given thickness differential;

creating a contour plot showing the time to stabilize for each item in the matrixed set;

assessing the contour plot and defining a preferred region based upon at least one of three variables wherein the variables include maximizing comfort which is a function of lens thickness, minimizing time to stabilize, and minimizing manufacturing difficulty which is a function of noncircularity;

selecting the peripheral geometry with a noncircularity component and a thickness differential which produces a time to stabilize within the preferred region; and fabricating a contact lens having a selected noncircularity component and a corresponding selected thickness differential.

2. The method of claim 1 wherein the maximizing comfort variable is inversely proportional to the thickness differential.

3. The method of claim 1 wherein the minimizing manufacturing difficulty variable is inversely proportional to the extent of noncircularity.

4. The method of claim 1 wherein the minimizing time to stabilize variable is a function of both the thickness differential and the extent of noncircularity.

5. The method of claim 1 wherein the matrixed set of peripheral geometries is derived from an initial starting design selected from the group consisting of known, existing, and commercialized designs.

* * * * *